US009636728B2

(12) United States Patent
Menosso et al.

(10) Patent No.: US 9,636,728 B2
(45) Date of Patent: May 2, 2017

(54) INTERMEDIATE CHAIN FOR DRAWING ASSEMBLIES OF DRAWING MACHINES

(71) Applicant: DANIELI & C. OFFICINE MECCANICHE SPA, Buttrio (IT)

(72) Inventors: Fausto Menosso, Pradamano (IT); Flavio Della Rossa, Buttrio (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 0 days.

(21) Appl. No.: 15/108,675

(22) PCT Filed: Dec. 31, 2014

(86) PCT No.: PCT/IB2014/067440
§ 371 (c)(1),
(2) Date: Jun. 28, 2016

(87) PCT Pub. No.: WO2015/101943
PCT Pub. Date: Jul. 9, 2015

(65) Prior Publication Data
US 2016/0318084 A1 Nov. 3, 2016

(30) Foreign Application Priority Data
Jan. 3, 2014 (IT) .............................. UD2014A0002

(51) Int. Cl.
B65G 23/14 (2006.01)
B21C 1/30 (2006.01)
(Continued)

(52) U.S. Cl.
CPC ............... B21C 1/30 (2013.01); B65G 23/14 (2013.01); B65H 51/14 (2013.01); F16G 13/06 (2013.01);
(Continued)

(58) Field of Classification Search
CPC B65H 51/14; F16G 13/06; B21C 1/30; B21L 11/10; B65G 15/14; B65G 15/16;
(Continued)

(56) References Cited

U.S. PATENT DOCUMENTS 2,868,356 A * 1/1959 Haaff ..................... B65G 23/14
198/833
3,285,485 A * 11/1966 Slator ..................... E21B 19/22
166/77.3

(Continued)

FOREIGN PATENT DOCUMENTS

EP 0645200 3/1995
WO 0114075 3/2001

OTHER PUBLICATIONS

International Search Report and Written Opinion, issued in the corresponding international PCT application No. PCT/IB2014/067440, dated May 15, 2015, 7 pages.

Primary Examiner — Mark A Deuble
(74) Attorney, Agent, or Firm — Hamre, Schumann, Mueller & Larson, P.C.

(57) ABSTRACT

An intermediate chain for drawing assemblies of drawing machines provided with at least one track having a plurality of contiguous links configured to act on a product being worked in order to draw it, is interposed between the corresponding track and support means of the track and comprises a plurality of contiguous links. Each of said links comprises an idle roll equipped with a through axial hole, a join pin and a connection element provided with a plurality of through holes configured to house at least said join pin. The connection element comprises two lateral support portions positioned in correspondence to axially opposite longitudinal ends of said idle roll, and a central connection portion, interposed transversely between the two lateral support portions and joined to both in order to reciprocally (Continued)

connect them, keeping them at a fixed and constant reciprocal distance and in a fixed and constant reciprocal position.

10 Claims, 2 Drawing Sheets

(51) Int. Cl.
 *B65H 51/14* (2006.01)
 *F16G 13/06* (2006.01)
 *B65G 15/16* (2006.01)
 *B65G 17/24* (2006.01)
 *B21L 11/10* (2006.01)

(52) U.S. Cl.
 CPC ............... *B21L 11/10* (2013.01); *B65G 15/16* (2013.01); *B65G 17/24* (2013.01)

(58) Field of Classification Search
 CPC ...... B65G 15/18; B65G 15/20; B65G 17/065; B65G 17/08; B65G 17/083; B65G 17/086; B65G 17/24; B65G 23/14

USPC .......................... 198/779, 833, 626.1–626.6
 See application file for complete search history.

(56) References Cited

U.S. PATENT DOCUMENTS

| | | | | |
|---|---|---|---|---|
| 5,261,525 A * | 11/1993 | Garbagnati | ............ | B65G 17/08 198/779 |
| 5,918,671 A * | 7/1999 | Bridges | ................... | E21B 19/22 166/77.3 |
| 5,975,203 A * | 11/1999 | Payne | ..................... | E21B 19/22 166/77.1 |
| 6,230,955 B1 * | 5/2001 | Parks | ................... | B65G 37/005 166/77.3 |
| 6,347,664 B1 * | 2/2002 | Perio, Jr. | ................. | E21B 19/22 166/77.3 |
| 2014/0141913 A1 * | 5/2014 | Yokoyama | ............... | F16G 13/18 474/206 |
| 2014/0346014 A1 * | 11/2014 | Andreoli | ................ | B65G 13/02 198/779 |

* cited by examiner

INTERMEDIATE CHAIN FOR DRAWING ASSEMBLIES OF DRAWING MACHINES

FIELD OF THE INVENTION

The present invention concerns a chain usable as an intermediate chain in drawing assemblies of drawing machines for metal products such as solid or tubular metal bars.

The intermediate chain according to the invention is applied to drawing assemblies comprising two opposite and counter-rotating tracks that collaborate, from opposite sides, with the product being worked to draw it through a drawplate of the drawing machine.

In particular, the intermediate chain according to the present invention can be interposed between the track of the drawing assembly and a corresponding support plate, in order to reduce the friction between these two components of the drawing assembly and to distribute uniformly the thrusts that act on the track during the drawing operations.

BACKGROUND OF THE INVENTION

Drawing machines for metal products are known, such as solid or tubular bars, that comprise a drawing assembly provided with two counter-rotating tracks, opposite each other with respect to a drawing axis.

Each track includes a plurality of links constrained to each other in sequence, on each of which a drawing clamp is mounted that, during use, presses against at least one bar subjected to drawing.

In particular, each drawing clamp of one track cooperates with a corresponding drawing clamp present in the opposite track to clamp from opposite sides the bar subjected to drawing, in one of its segments that has already been drawn.

Each track is closed in a ring around a support plate and is made to rotate continuously by toothed wheels, generally two, one drive wheel and one driven, mounted on opposite ends of the same support plate.

It is known to interpose, between the support plate and the corresponding track, an intermediate chain of the type with rolls with the function of reducing the friction between the links of the track and the support plate, introducing a rolling type friction between the two components. In this way, intermediate chains act as bearings and allow to work at higher drawing speeds, thanks to the possibility of making the tracks rotate at higher rotation speeds.

Intermediate chains also have the function of discharging uniformly the thrusts that act on the individual links of the tracks.

It is known that intermediate chains are usually idle and receive motion from the tracks due to their contact with the links of said tracks.

Intermediate chains generally consist of links connected to each other with a desired play that allows to prevent the blockage of the movement of the intermediate chains.

Intermediate chains are known whose links each comprise an idle roll, two connection elements disposed symmetrically opposite each other at the two opposite longitudinal ends of the idle roll, and a join pin, passing axially inside the idle roll and inside through holes made in the connection elements.

The connection of consecutive links is achieved through connection of the respective connection elements, each of which is suitably configured to at least partly overlap two idle rolls.

In these known solutions, the transfer of the motion from the tracks to the intermediate chains occurs on the idle rolls, which therefore perform a drawing action on the links through the join pins connected to the connection elements.

One disadvantage of known intermediate chains is that the stresses to which the links of the chains are subjected are concentrated in the lateral housing and sliding seatings of the idle rolls provided in the connection elements: the lateral seatings are therefore subject to considerable wear. This entails frequent maintenance operations, and can also negatively affect the correct functioning of the intermediate chains in their entirety.

Another disadvantage of known intermediate chains is that, although flexible and light, they are subject to possible instability due to the idle rolls going off-axis if there is asymmetric wear of said housing and sliding seatings. This off-axis position can cause a deformation of the idle rolls and can also cause the corresponding intermediate chain to come out of its rotation seating, with the consequent possibility of damaging the intermediate chain itself, as well as the drawing assembly. This can be translated into a considerable economic damage due to the shutting down of the machine to restore the correct functioning of the drawing assemblies One purpose of the present invention is to produce an intermediate chain that is able to reduce the wear of the housing and sliding seatings of the idle rolls, uniformly discharging onto the whole link the stresses deriving from the thrusts acting on the idle rolls.

Another purpose of the present invention is to produce an intermediate chain that has greater stability than that which can be obtained from known intermediate chains, and that is able to maintain said stability over time.

Another purpose of the present invention is to produce an intermediate chain that is simple to make and assemble, consisting of a limited number of components and that requires a reduced number of operations for its assembly.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, an intermediate chain according to the present invention can be used in drawing assemblies of drawing machines provided with at least one track having a plurality of contiguous links configured to act on a product being worked in order to draw it. In particular, the intermediate chain is interposed between the corresponding track and support means of the track, such as a support plate, and includes a plurality of contiguous links, each of which comprises an idle roll equipped with a through axial hole, a join pin and a connection element provided with a plurality of through holes configured to house at least said join pin.

According to a characteristic aspect of the present invention, the connection element comprises two lateral support portions positioned in correspondence to axially opposite longitudinal ends of the idle roll, and a central connection portion, interposed transversely between the two support portions and joined to both in order to reciprocally connect them, keeping them at a fixed and constant reciprocal distance and in a fixed and constant reciprocal position.

In this way the advantage is obtained of keeping the idle roll always guided and in the same position, determined by the fact that the lateral support portions are reciprocally fixed and parallel due to the presence of the central connection portion.

This allows to prevent, for example, the idle roll from going off-axis even in the event that it is asymmetrically worn, or the lateral support portions are asymmetrically worn, which could cause damage to the intermediate chain and, in more critical cases, could cause the chain to come out from its seating.

According to the present invention, moreover, the central connection portion comprises a concave support wall, configured to contact the idle roll and having a concavity coordinated with the radius of the idle roll.

The fact that the idle roll is in contact with the support wall of the central connection portion allows to advantageously obtain the uniform distribution of the stresses acting on the idle roll during the drawing on the connection element, in particular on the central connection portion itself.

This distribution allows to prevent concentrations of stresses and therefore allows to obtain an advantageously long working life of the containing elements and, consequently, of the intermediate chain.

According to one formulation of the present invention, the central connection portion and the two lateral support portions define a single body of the connection element.

In some forms of embodiment, the single body is obtained by making the central connection portion in one piece with the two lateral support portions.

According to a variant, the central connection portion is made separately with respect to the two lateral support portions and made integral with the two lateral support portions in an irremovable manner, for example by welding, screwing, caulking or other suitable connection technique.

In this way a connection element is advantageously obtained that is solid, robust and able to guarantee that the correct positioning and alignment of the lateral support portions is maintained during the functioning of the drawing machine, even when the intermediate chain is subjected to great stresses.

According to some forms of embodiment of the present invention, the connection element of one of the links of the intermediate chain is configured to be positioned with its own lateral support portions at least partly overlapping both the longitudinal ends of at least two contiguous idle rolls and also the lateral support portions of the connection element of an adjacent link, and to be positioned with its central connection portion in contact with one of said two idle rolls.

Another advantage of the present invention is connected to the configuration indicated above, in which the idle roll is surrounded by the support wall of the central connection portion of a connection element, by the lateral support portions of the latter, and by the central connection portion of the adjacent connection element. This configuration confers solidity and longevity to the intermediate chain, enclosing and protecting the idle rolls and therefore limiting the wear thereon and the possibility of damage or other.

According to some aspects of the present invention, the plurality of through holes of the connection element of each of the links of the intermediate chain include a first through hole and a second through hole made in one of the two lateral support portions, and a third through hole and a fourth through hole made in the other of the two lateral support portions, wherein all the through holes have parallel axes with respect to each other.

According to the present invention, the first through hole and the third through hole are reciprocally aligned and coaxial, as are the second and the fourth through holes. In particular the first and the third through holes of the connection element of one of the links of the intermediate chain are aligned and coaxial both with the second and the fourth through holes of the connection element of the adjacent link, and with the axial hole of the idle roll. Moreover, the join pin is inserted in the first, second, third and fourth through holes and in the axial hole.

In some forms of embodiment, the connection element of one link of the intermediate chain is configured to be located with its lateral support portions at least partly overlapping both the longitudinal ends of at least two contiguous idle rolls, and the lateral support portions of the connection element of an adjacent link, and to be located with its central connection portion in contact with one of the two idle rolls.

BRIEF DESCRIPTION OF THE DRAWINGS

These and other characteristics of the present invention will become apparent from the following description of some forms of embodiment, given as a non-restrictive example with reference to the attached drawings wherein.

In the following description, the same reference numbers indicate identical parts of the intermediate chain for a drawing assembly of a drawing machine according to the present invention, also in different forms of embodiment. It is understood that elements and characteristics of one form of embodiment can be conveniently incorporated into other forms of embodiment without further clarifications.

DETAILED DESCRIPTION OF FORMS OF EMBODIMENT

We shall now refer in detail to the various forms of embodiment of the present invention, of which one or more examples are shown in the attached drawing. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

Figure 1:
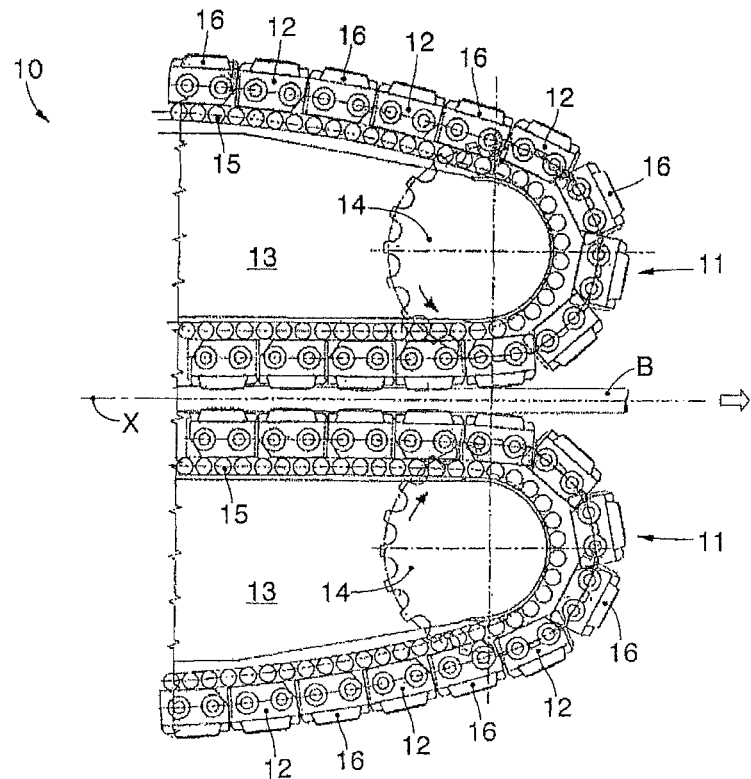
FIG. 1 is a lateral view of a drawing assembly comprising an intermediate chain according to the present invention.

FIG. 1 is used to describe forms of embodiment of a drawing assembly 10 of a drawing machine for metal products, such as bars B for example.

The drawing machine is in itself known and therefore not shown in the attached drawings.

The drawing assembly 10 can be configured to draw a bar B to be drawn along a drawing axis X.

In some forms of embodiment, the drawing assembly 10 can include a pair of tracks 11, reciprocally counter rotating and disposed symmetrical and opposite each other with respect to the drawing axis X, above and below the latter for example.

Each track 11 can include a plurality of links 12, constrained to each other by means of suitable articulations, and on each of which a corresponding drawing clamp 16 can be mounted in a selectively removable way.

The two tracks 11, in a known manner, can be mounted on respective support plates 13, and made to rotate continuously by toothed wheels 14 cooperating with the links 12.

For each track 11, the drawing assembly 10 can include an intermediate chain 15, of the type with rolls for example, interposed between the track 11 and the corresponding support plate 13 to act as a mean to reduce the friction between these two components.

Each intermediate chain 15 introduces rolling friction between the track 11 and the support plate 13, preventing the onset of sliding friction between them, which would limit the effectiveness of the entire drawing assembly 10, hindering the relative motion between track 11 and support plate 13.

The rotation conferred on the tracks 11 by the toothed wheels 14 can be intended to bring opposite pairs of drawing clamps 16 belonging to the two tracks 11 into contact with the bar B, in order to exert a pressure action on the bar B and impart to it a desired drawing traction along the drawing axis X.

The intermediate chain 15 can include a plurality of links 17, adjacent to each other and connected to each other so as to define the intermediate chain 15 itself.

Figure 2:
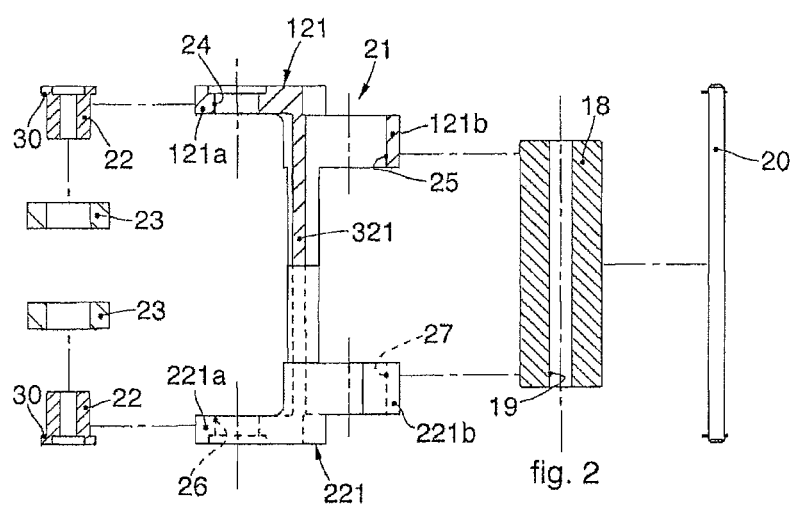
FIG. 2 is a plan view, partly sectioned, of a link of the intermediate chain in FIG. 1.

FIG. 2 is an exploded view of a link 17 and is used to describe possible forms of embodiment of the links 17 of the intermediate chain 15.

In such forms of embodiment, each link 17 can include an idle roll 18 equipped with a through axial hole 19, a join pin 20 and a connection element 21.

In possible solutions, auxiliary support means can be provided, which can include, as shown in FIG. 2 by way of example, a bushing 22 and a metal tube 23.

In particular, the connection element 21 is configured to support the idle roll 18 and to allow the connection between two adjacent links 17, as will be clear from the detailed description hereafter.

To this end, the connection element 21 can be made of a material, for example metal, such as steel, cast iron, bronze or other copper alloys, aluminum or its alloys, resistant to wear, corrosion, mechanical stresses and other stresses that originate during drawing operations.

Figure 3:
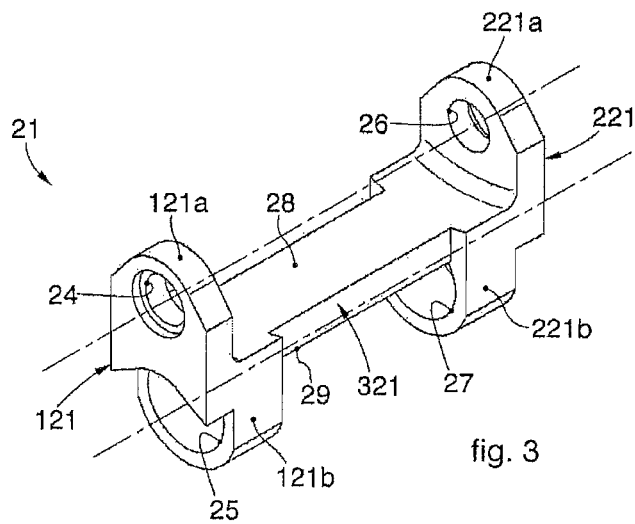
FIG. 3 is a three-dimensional view of a component of the link in FIG. 2.

In some forms of embodiment, described by way of example with reference to FIGS. 2 and 3, the connection element 21 can be essentially H-shaped, which can be defined by two lateral support portions, in particular a first lateral support portion 121 and a second lateral support portion 221, and by a central connection portion 321, interposed transversely between the two lateral support portions 121, 221 and attached to both.

The central connection portion 321, in possible implementations can be made as a separate body from the two lateral support portions 121, 221, and subsequently made integral therewith in a non-removable manner, for example by welding, screwing, caulking or other suitable connection technique, or it can be made in a piece, in a single body with the two lateral support portions 121, 221, by means of molding for example.

The central connection portion 321 has the function of connecting the two lateral support portions 121, 221 to each other, to keep them distanced from each other at a fixed distance and to define with them a single body for the connection element 21.

The central connection portion 321 can include a containing wall 28 and a support wall 29, both concave and positioned on opposite sides along the direction of longitudinal development of the two lateral support portions 121, 221.

In possible solutions, the support wall 29 is configured to enter, when the link 17 is assembled, into contact with the idle roll 18, and can have a concavity coordinated with the radius of the idle roll 18 and smaller than that of the containing wall 28.

In some forms of embodiment, the two lateral support portions 121, 221 can be symmetrical with respect to the center line of the central connection portion 321.

It can also be provided that the two lateral support portions 121, 221 are configured essentially parallel to each other.

The central connection portion 321 can be essentially orthogonal to the two lateral support portions 121, 221 that it reciprocally connects.

It is provided that the central connection portion 321 is configured to maintain the lateral support portions 121, 221 at a constant distance and in a constant reciprocal position.

In some forms of embodiment, described with reference by way of example to FIGS. 2 and 3, both the first lateral support portion 121 and the second lateral support portion 221 can include a pair of through holes, respectively defined by a first through hole 24 and a second through hole 25, and by a third through hole 26 and a fourth through hole 27.

Possible implementations of the present invention can provide that the through holes 24, 25, 26, 27 all have parallel axes.

In some forms of embodiment, the first through hole 24 and the third through hole 26 can be reciprocally aligned and coaxial.

In other forms of embodiment, the second through hole 25 and the fourth through hole 27 can be reciprocally aligned and coaxial.

Possible solutions, which can be combined with the forms of embodiment described here, can provide that both the first 121 and the second 221 lateral support portions have a shape defined by a first segment, respectively 121a and 221a, and by a second segment, respectively 121b and 221b.

The first segment 121a, 221a and the second segment 121b, 221b of the respective first 121 and second 221 lateral support portions are joined to each other in correspondence to the central connection portion 321 and have a longitudinal development on opposite sides thereof.

Moreover, the first segment 121a, 221a can be offset with respect to the respective second segment 121b, 221b along the development of the central connection portion 321. Consequently, the lateral support portions 121, 221 can be more distanced in correspondence to their own first segments 121a, 221a and nearer in correspondence to their second segments 121b, 221b.

This solution is intended to allow the insertion of the second segments 121b, 221b of the connection element 21 of one link 17 inside the space delimited by the first segments 121a, 221a of the connection element 21 of the adjacent link 17.

Figure 4:
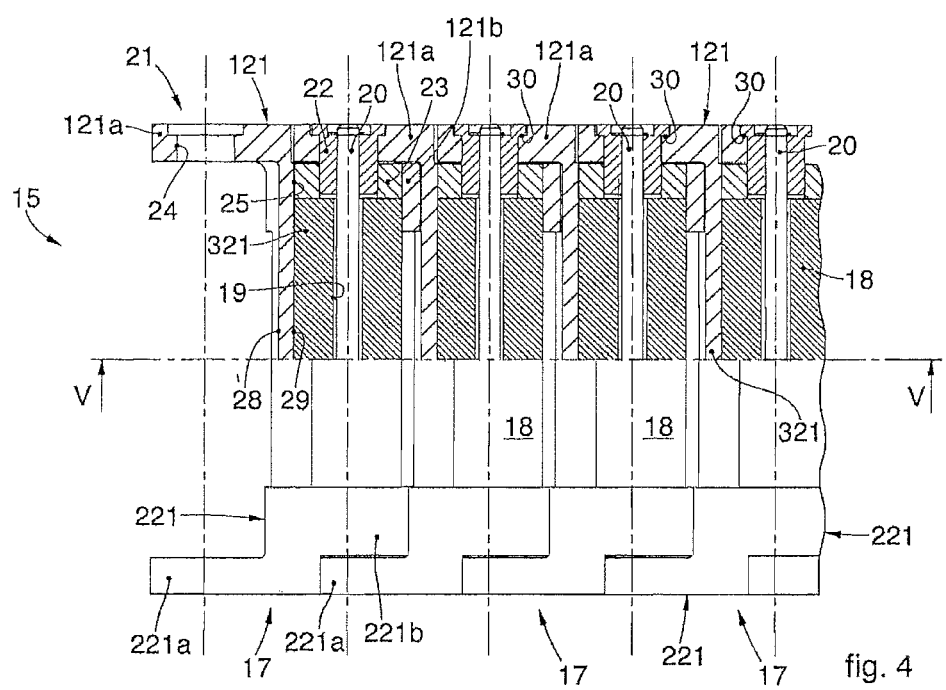
FIG. 4 is a plan view of a part of the intermediate chain in FIG. 1.

FIGS. 2 and 4 can be used to describe forms of embodiment in which the second through hole 25 and the fourth through hole 27 are configured to each contain a longitudinal end of the idle roll 18. In this way, the idle roll 18 can be positioned coaxial to the two through holes 25, 27 and completely constrained radially.

In other forms of embodiment, it can be provided that the second segment 121b of the first lateral support portion 121 and the second segment 221b of the second lateral support portion 221 are located at a greater reciprocal distance than the longitudinal extension of the idle roll 18, in order to contain it in the space delimited by them.

Figure 5:
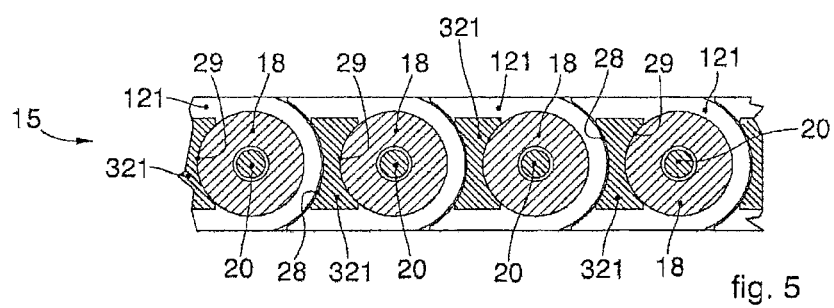
FIG. 5 is a lateral section view of the part of chain in FIG. 4.

FIGS. 4 and 5 can be used to describe forms of embodiment of an intermediate chain 15 in which the links 17 are located adjacent and connected to each other. For simplicity and clarity of exposition, only four consecutive links 17 are shown by way of example.

The assembly of the intermediate chain 15 can first of all provide the preparation of a first connection element 21 and the axial alignment of an idle roll 18 with the second through hole 25 and with the fourth through hole 27 of the connection element 21, so that the axial hole 19 of the idle roll 18 is coaxial with the through holes 25, 27.

Subsequently, a second connection element 21 of an adjacent link 17 can be positioned so that the second segments 121b, 221b of their own lateral support portions 121, 221 are contained inside the space delimited by the first segments 121a, 221a of the lateral support portions 121, 221 of the first connection element 21.

Moreover, the first 24 and third 26 through holes of the second connection element 21 are positioned coaxial to the second 25 and fourth 27 through holes of the first connection element 21.

The join pin 20 is then inserted inside the through holes 25, 27 of the first connection element 21, inside the through holes 24 and 26 of the second connection 21, and inside the axial hole 19 of the idle roll 18. The join pin 20 is subsequently immobilized axially, in this way connecting the two adjacent links 17 to each other and keeping the idle roll 18 in the desired position.

In particular, the idle roll 18 is in contact with the support surface 29 of the central connection portion 321 of the first connection element 21, and distanced from the containing wall 28 of the second connection element 21 of the adjacent link 17.

The containing wall 28, the lateral support portions 121, 221, and the support wall 29 surround the idle roll 18, enclosing it and protecting it.

The fact that the idle roll 18 is in contact with the support wall 29 allows the uniform distribution on the containing element 21, in particular on the central connection portion 321, of the stresses acting on the idle roll 18 during drawing.

This distribution allows to prevent concentrations of stresses and therefore allows to obtain an advantageously long working life of the containing elements 21 and, consequently, of the intermediate chain 15.

Moreover, the idle roll 18 is always guided and maintained in the same position, determined by the fact that the lateral support portions 121, 221 are reciprocally fixed and parallel due to the presence of the central connection portion 321.

This allows to prevent, for example, the idle roll 18 from going off-axis even in the event that it is asymmetrically worn, or the lateral support portions 121, 221 are asymmetrically worn.

The connection described above of the two links 17 can be repeated in a similar way for all the links 17 that make up the intermediate chain 15.

In possible forms of embodiment, which can be combined with all the forms of embodiment described here, the positioning of two metal tubes 23 can be provided, resting on the ends of the idle roll 18, in particular a metal tube 23 for each through hole 25, 27 of the first connection element 21.

The metal tubes 23 essentially act as containing spacers of the idle roll 18 in the space interposed between the second segments 121b, 221b of the first connection element 21.

In some solutions, the attachment of the idle roll 18 and the connection of two adjacent links 17 can be obtained using two bushings 22, positioned on opposite sides in the connection elements 21. In these solutions, one bushing 22 can be inserted in the second through hole 25 of the first connection element 21 and in the first through hole 24 of the second connection element 21, and the second bushing 22 can be inserted in the fourth through hole 27 of the first connection element 21 and in the third through hole 26 of the second connection element 21.

Each bushing 22 can therefore act as a constraint against the reciprocal sliding of the lateral support portions 121, 221 of the first connection element 21 on those of the second connection element 21.

Moreover, axial clamping means 30 can be associated to the bushings 22 and to the join pin 20 to keep the idle roll 18 in position.

It is clear that modifications and/or additions of parts may be made to the intermediate chain 15 as described heretofore, without departing from the field and scope of the present invention.

It is also clear that, although the present invention has been described with reference to some specific examples, a person of skill in the art shall certainly be able to achieve many other equivalent forms of intermediate chain, having the characteristics as set forth in the claims and hence all coming within the field of protection defined thereby.

The invention claimed is:

1. An intermediate chain for drawing assemblies of drawing machines provided with at least one track having a plurality of contiguous links configured to act on a product being worked in order to draw it, said intermediate chain being interposed between the corresponding track and support means of the track and comprising a plurality of contiguous links, each of said links comprising an idle roll equipped with a through axial hole, a join pin and a connection element provided with a plurality of through holes configured to house at least said join pin, wherein said connection element comprises two lateral support portions positioned in correspondence to axially opposite longitudinal ends of said idle roll, and a central connection portion, interposed transversely between said two lateral support portions and joined to both in order to reciprocally connect them, keeping them at a fixed and constant reciprocal distance and in a fixed and constant reciprocal position.

2. The intermediate chain as in claim 1, wherein said central connection portion comprises a concave support wall, configured to contact said idle roll and having a concavity coordinated with a radius of said idle roll.

3. The intermediate chain as in claim 1, wherein said central connection portion and said two lateral support portions define a single body of said connection element.

4. The intermediate chain as in claim 3, wherein said central connection portion is made in a piece with said two lateral support portions.

5. The intermediate chain as in claim 3, wherein said central connection portion is made separately with respect to said two lateral support portions and made integral with said two lateral support portions in an irremovable manner.

6. The intermediate chain as in claim 1, wherein the connection element of one of said links is configured to be positioned with its own lateral support portions at least partly overlapping both the longitudinal ends of at least two contiguous idle rolls and also the lateral support portions of the connection element of an adjacent link, and to be positioned with said central connection portion in contact with one of said two idle rolls.

7. The intermediate chain as in claim 1, wherein said plurality of through holes of the connection element of each of said links comprises a first through hole and a second through hole, made in one of said two lateral support portions, and a third through hole and a fourth through hole made in the other of said two lateral support portions, wherein said first, second, third and fourth through holes have parallel axes with respect to each other.

8. The intermediate chain as in claim 7, wherein said first through hole and said third through hole are reciprocally aligned and coaxial, wherein said second through hole and said fourth through hole are reciprocally aligned and coaxial wherein the first and the third through holes of the connection element of one of said links are aligned and coaxial with both the second and the fourth through holes of the connection element of the adjacent link, and also with said axial hole of the idle roll, said join pin being inserted in said first, second, third and fourth through holes and in said axial hole.

9. The intermediate chain as in claim 1, wherein each of said lateral support portions has a shape defined by a first segment and by a second segment, said first segment and said second segment being joined to each other in correspondence to said central connection portion and having a longitudinal development on opposite sides of said central connection portion.

10. The intermediate chain as in claim 9, wherein the first segment of each of said lateral support portions is offset with respect to the respective second segment along the development of the central connection portion, said lateral support portions being more distanced in correspondence to said first segments and nearer in correspondence to said second segments.

* * * * *